Patented May 23, 1933

1,910,441

UNITED STATES PATENT OFFICE

HERBERT A. LUBS, OF WILMINGTON, DELAWARE, AND PAUL C. BOWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

SULPHUR DYE AND PROCESS OF MAKING THE SAME

No Drawing.  Application filed March 7, 1928. Serial No. 259,914.

This invention relates to new and improved sulphur dyes and the process of making the same. More particularly it relates to sulphur dyes made by the fusion of aromatic compounds, with an alkali metal sulphide in the presence of sulphite cellulose liquors or the solid products therefrom, obtained as by-products in the manufacture of sulphite pulp.

It is the object of this invention to produce sulphur dyes, particularly sulphur browns of superior dyeing properties and of full shades at a low cost.

A great number of organic materials have been used heretofore for the production of sulphur browns. Various aromatic compounds, especially combinations of nitro and amino compounds, have been fused with sodium polysulphide, and even the use of crude products such as saw-dust and cotton seed hulls has been proposed. It has, also, been proposed to make sulphur colors by the thionation of nitro or amino compounds with non-crystallizable polysaccharides such as starch.

We have now discovered that sulphur browns of excellent shade and fastness can be made by the polysulphide fusion of such suitable aromatic compounds with sulphite cellulose products such as those obtained from the waste sulphite liquors as by-products in the manufacture of sulphite pulp. This material may be obtained either in solution or in dry form and will hereinafter be designated as a "sulphite cellulose compound." In dry form it is marketed under the name of sulphite cellulose pitch.

The following specific embodiment is furnished as an illustration of the process:

Example

Into a suitable reaction vessel there are introduced 1.76 parts of 60% sodium sulphide, 1.86 parts of sulphur, and 4.25 parts of water. This is heated until complete solution has been effected. To this polysulphide solution there is added, at a temperature of 90–100° C., 1.0 part of dinitro toluene and 0.6 part of sulphite-cellulose pitch. During the addition vigorous agitation is maintained. The temperature of the mass is then raised to 240–250° by the evaporation of water, and held there until color formation is complete. This will require ten to twenty hours. The resulting fusion mass may then be discharged, ground, and used directly for dyeing purposes or it may be purified by dissolving in water and precipitating by means of air, acid or salt.

It is to be understood that the above example is merely illustrative and that variations in the relative amounts of materials or in the temperature of the heating may be made and will have a decided effect on the shade obtained. For instance, by increasing the amount of sulphite-cellulose pitch, a much yellower shade is produced. By decreasing the final temperature redder shades are obtained. The addition of small amounts of copper salts, as copper sulphate, to the melt will also decidedly influence the final shade.

The number of aromatic compounds which are known to be adapted to yield sulphur dyes upon fusion with sulphur or an alkali metal polysulphide is very large and it is impractical to attempt to list them all herein. Such suitable compounds are, however, described in the text books and well known to chemists skilled in the art. Any of these aromatic compounds is adapted to yield a sulphur dye in conjunction with the sulphite cellulose compound. Of these aromatic compounds, however, it has been found that the aromatic compounds having free nitro, amino or hydroxy groups, either alone or in combination, are especially well adapted for this purpose.

Besides dinitrotoluene, other nitro compounds may be used, such, for example, as dinitrobenzene, trinitrophenol, dinitrophenol, dinitrocresol, dinitrochlorbenzene, etc. Mononitro compounds may also be used, but we have found the di- or tri-nitro compounds preferable. Among the organic amino compounds which may be employed to advantage may be mentioned, for example, meta-phenylene-diamine, meta-toluylene-diamine, para-amino-phenol, para-nitro-o-amino-phenol, etc., or nitro amino compounds, such as meta-nitro-p-toluidine, picramic acid, etc.

Aromatic compounds having a free hydroxy group, as ortha-, para-, or meta-cresol will also produce sulphur dyes in conjunction with sulphite-cellulose pitch.

In general, the dyes produced according to this process will vary in shade from a yellow brown to a blackish brown. They are remarkably fast and of very desirable shade.

We claim:

1. The process of making a brown sulphur dye which comprises mixing an aromatic nitro compound with an alkali metal polysulphide and heating the mixture to fusion in the presence of a sulphite-cellulose compound.

2. The process of making a brown sulphur dye which comprises mixing an aromatic dinitro compound with an alkali metal polysulphide and heating the mixture to fusion in the presence of a sulphite-cellulose compound.

3. The process of making a brown sulphur dye which comprises mixing dinitro toluene with an alkali metal polysulphide and heating the mixture to fusion in the presence of a sulphite-cellulose compound.

4. The sulphur dye obtainable by mixing dinitro toluene with an aklali metal polysulphide and heating to fusion in the presence of a sulphite-cellulose compound, said dye being of a yellow-brown to blackish-brown shade.

5. The sulphur dye obtainable by heating to about 240° C. a solution containing 1.76 parts of 60% sodium sulphide and 1.86 parts of sulphur with 1 part of dinitro toluene and 0.6 parts of sulphite cellulose pitch.

6. The process of making brown sulphur dyes which comprises fusing a mixture of a sulphite cellulose compound and an aromatic compound of the group consisting of di-nitro-benzene, di-nitro-toluene, di-nitrophenol, di-nitro-cresol, di-nitro-chloro-benzene, tri-nitro-phenol, meta-phenylene-diamine, meta-toluylene-di-amine, para-amino-phenol, para-nitro-ortho-amino-phenol, meta-nitro-para-nitro-ortho-amino-phenol, meta-nitro-para-toluidine, picramic acid, ortho-cresol, meta-cresol and para-cresol with an alkali metal sulphide.

7. The process of making brown sulphur dyes which comprises fusing a mixture of a sulphite cellulose compound and an aromatic compound containing at least one of the groups $-NO_2$, $-NH_2$ and $-OH$, said aromatic compound being capable of producing a sulphur dye when fused with an alkali metal sulphide, with an alkali metal sulphide.

8. The dyestuff which is obtainable by the process of claims 6.

9. The dyestuff which is obtainable by the process of claim 7.

In testimony whereof we affix our signatures.

HERBERT A. LUBS.
PAUL C. BOWERS.